US012553592B1

(12) United States Patent
Zhang

(10) Patent No.: US 12,553,592 B1
(45) Date of Patent: Feb. 17, 2026

(54) SPLICED LAMP POST AND LAMP

(71) Applicant: Huaxin (Dongguan) Lighting Co., LTD, Guangdong (CN)

(72) Inventor: Haibin Zhang, Guangdong (CN)

(73) Assignee: Huaxin (Dongguan) Lighting Co., LTD, Dongguan (CN)

( * ) Notice: Subject to any disclaimer, the term of this patent is extended or adjusted under 35 U.S.C. 154(b) by 0 days.

(21) Appl. No.: 19/243,332

(22) Filed: Jun. 19, 2025

(30) Foreign Application Priority Data

Jun. 6, 2025 (CN) ......................... 202521159233.6

(51) Int. Cl.
*F21V 17/00* (2006.01)
*F21S 4/28* (2016.01)
*F21S 6/00* (2006.01)
*F21V 19/00* (2006.01)
*F21V 23/06* (2006.01)
*F21Y 103/10* (2016.01)

(52) U.S. Cl.
CPC .............. *F21V 17/007* (2013.01); *F21S 4/28* (2016.01); *F21S 6/00* (2013.01); *F21V 19/0005* (2013.01); *F21V 19/009* (2013.01); *F21V 23/06* (2013.01); *F21Y 2103/10* (2016.08)

(58) Field of Classification Search
CPC .. F21V 17/007; F21V 19/0005; F21V 19/009; F21V 23/06; F21S 4/28; F21S 6/00; F21Y 2103/10
See application file for complete search history.

(56) References Cited

U.S. PATENT DOCUMENTS 5,016,154 A 5/1991 Leeyeh
10,054,303 B2 8/2018 Zheng et al.
11,892,132 B2 2/2024 Zheng et al.
11,892,147 B1 * 2/2024 Jing .......................... F21S 6/00
2006/0291220 A1 * 12/2006 Chen ....................... F21V 21/02 362/382
2014/0036505 A1 * 2/2014 Barton .................. F21V 21/005 362/249.06
2019/0120443 A1 * 4/2019 Xia ......................... F21S 6/002
2022/0397264 A1 * 12/2022 Chen ...................... H01R 31/06

FOREIGN PATENT DOCUMENTS

CN 203395720 U * 1/2014

OTHER PUBLICATIONS

English translation of Liu CN-203395720-U (Year: 2014).*

* cited by examiner

*Primary Examiner* — Evan P Dzierzynski

(57) ABSTRACT

A spliced lamp post includes a first lamp rod, a second lamp rod, and a plug-in connector. A first plug-in end of the plug-in connector is connected with a first end of the first lamp rod, a second plug-in end of the plug-in connector is connected with a front end of the second lamp rod, and the first end of the first lamp rod can abut against the front end of the second lamp rod, thereby achieving seamless splicing of the first lamp rod and the second lamp rod.

13 Claims, 19 Drawing Sheets

SPLICED LAMP POST AND LAMP

CROSS REFERENCE TO RELATED APPLICATIONS

This application claims priority benefits to Chinese Patent Application No. 2025211592336, filed on Jun. 6, 2025, the contents of which are incorporated herein by reference.

TECHNICAL FIELD

The present application relates to lamps, and in particular, to a spliced lamp post and a lamp.

BACKGROUND

A lamp post utilizes side-emitting illumination. To meet lighting requirements, the lamp post is generally provided with an extended lamp rod. During transportation, the lamp rod requires substantial packaging materials and occupies significant space, making packaging and transportation cumbersome and costly, and increasing the risk of damage to a lamp.

SUMMARY

An objective of the present application is to provide a spliced lamp post and a lamp, having the advantages of compact storage, low packaging and transportation costs, a good lighting effect after splicing, and stable splicing.

In order to achieve the above objective, the present application provides the following technical solutions: a spliced lamp post includes: a first lamp rod provided with a first end, where the first end of the first lamp rod is provided with a first electrical connector; a second lamp rod having a front end, where the front end of each second lamp rod is provided with a second electrical connector; and a plug-in connector having a first plug-in end and a second plug-in end. The first plug-in end of the plug-in connector is connected with the first end of the first lamp rod, the second plug-in end of the plug-in connector is connected with the front end of the second lamp rod, and when the first end of the first lamp rod abuts against the front end of the second lamp rod, the first electrical connector and the second electrical connector are connected and circuit conduction is activated.

In another aspect, a lamp is provided, and includes a foldable lamp base and the above spliced lamp post.

The foldable lamp base includes a first bottom plate and a second bottom plate, the first bottom plate and the second bottom plate are connected through a hinge mechanism, the first bottom plate is provided with a first fixing hole, and the second bottom plate is provided with a second fixing hole; the first lamp rod has a second end, the second end of the first lamp rod is provided with a connector, and the connector is provided with a first fixing post and a second fixing post; and the first fixing post is inserted into the first fixing hole, and the second fixing post is inserted into the second fixing hole, enabling connection between the spliced lamp post and the lamp base and maintaining an unfolded state of the first bottom plate and the second bottom plate.

BRIEF DESCRIPTION OF THE DRAWINGS

The accompanying drawings of the specification constituting a part of the present application are used to provide a further understanding of the present application. The exemplary embodiments of the present application and descriptions thereof are used to explain the present application, and do not constitute an improper limitation on the present application.

DETAILED DESCRIPTION OF THE EMBODIMENTS

The present application is described in detail with reference to the accompanying drawings and in conjunction with the embodiments as below. Each example is provided by way of explanation of the present application and is not intended to limit the present application. In fact, those skilled in the art should understand that modifications and variations may be made to the present application without departing from the scope or spirit of the present application. For example, features illustrated or described as part of one embodiment may be used in another embodiment to yield yet a further embodiment. Therefore, it is intended that the present application includes such modifications and variations that fall within the scope of the appended claims and equivalents thereof.

In the description of the present application, orientational or positional relationships indicated by terms such as "longitudinal," "transverse," "upper," "lower," "front," "rear," "left," "right," "vertical," "horizontal," "top," and "bottom" are based on those shown in the accompanying drawings, are used merely for convenience in describing the present application, and do not require the present application to be constructed and operated in a specific orientation, and thus should not be construed as limiting the present application. Terms such as "connected," "connection," and "arranged" as used in the present application should be understood in a broad sense. For example, it may refer to a fixed connection, or a detachable connection; it may refer to a direct connection or an indirect connection through an intermediate component; or it may refer to a wired electrical connection, a wireless electrical connection, or a wireless communication signal connection. Those of ordinary skill in the art may understand specific meanings of the above terms according to specific situations.

One or more examples of the present application are illustrated in the accompanying drawings. The detailed description uses numerical and alphabetical labels to refer to the features in the accompanying drawings. Similar or analogous labels in the accompanying drawings and descriptions have been used to refer to similar or analogous parts of the present application. As used herein, terms "first," "second," "third", etc., are interchangeably used to distinguish one component from another and are not intended to indicate the position or importance of individual components.

Figure 1:
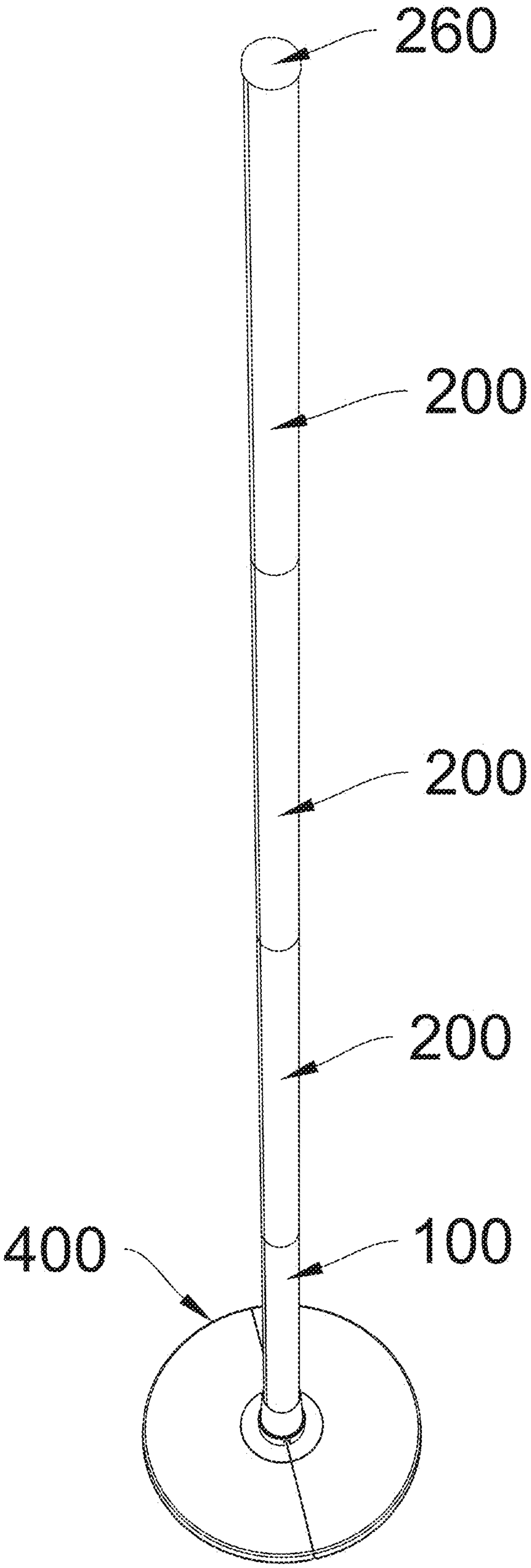
FIG. 1 is a perspective view of a lamp according to an embodiment of the present application.
Figure 2:
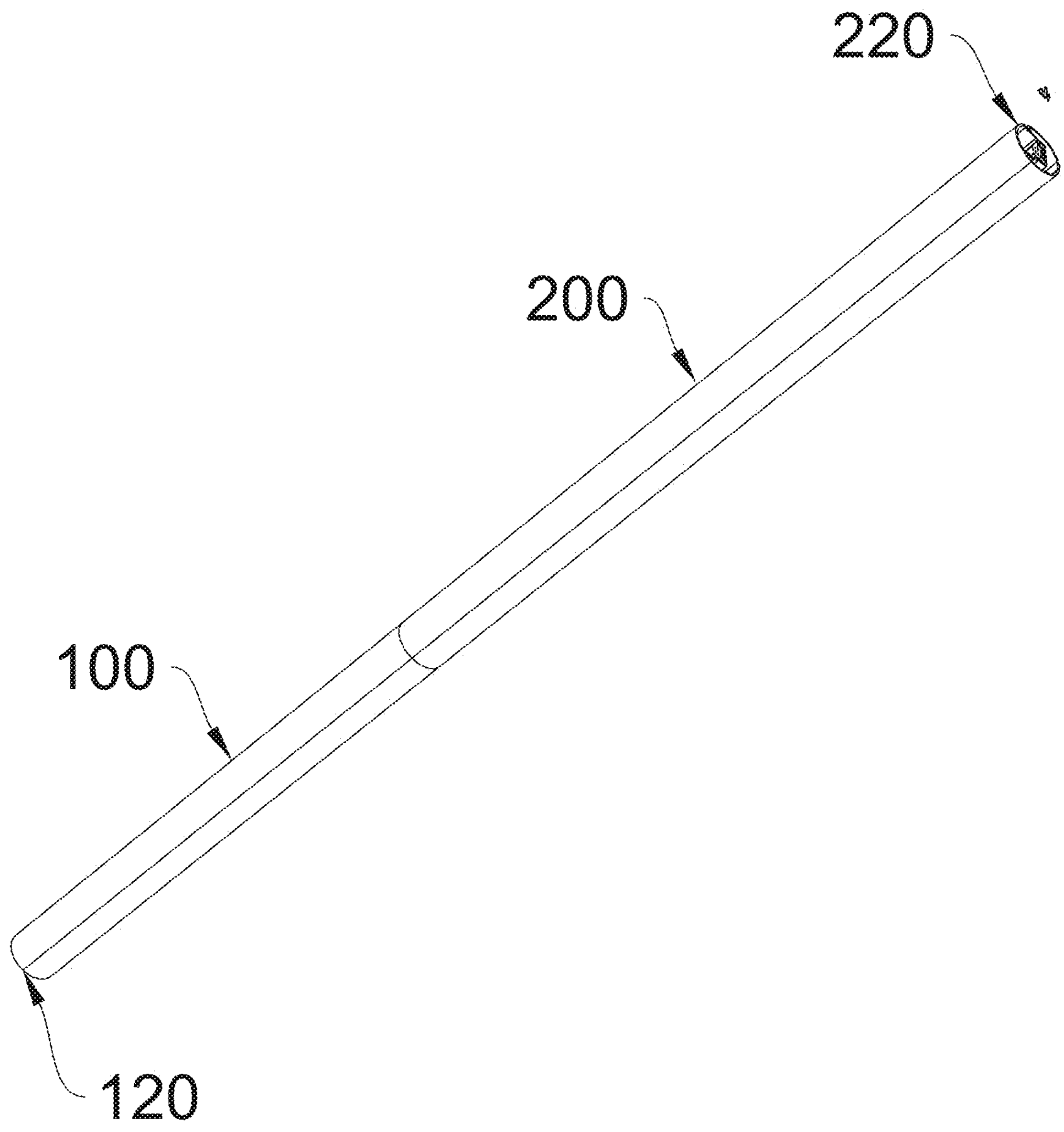
FIG. 2 is a perspective view of a spliced lamp post according to an embodiment of the present application.
Figure 3:
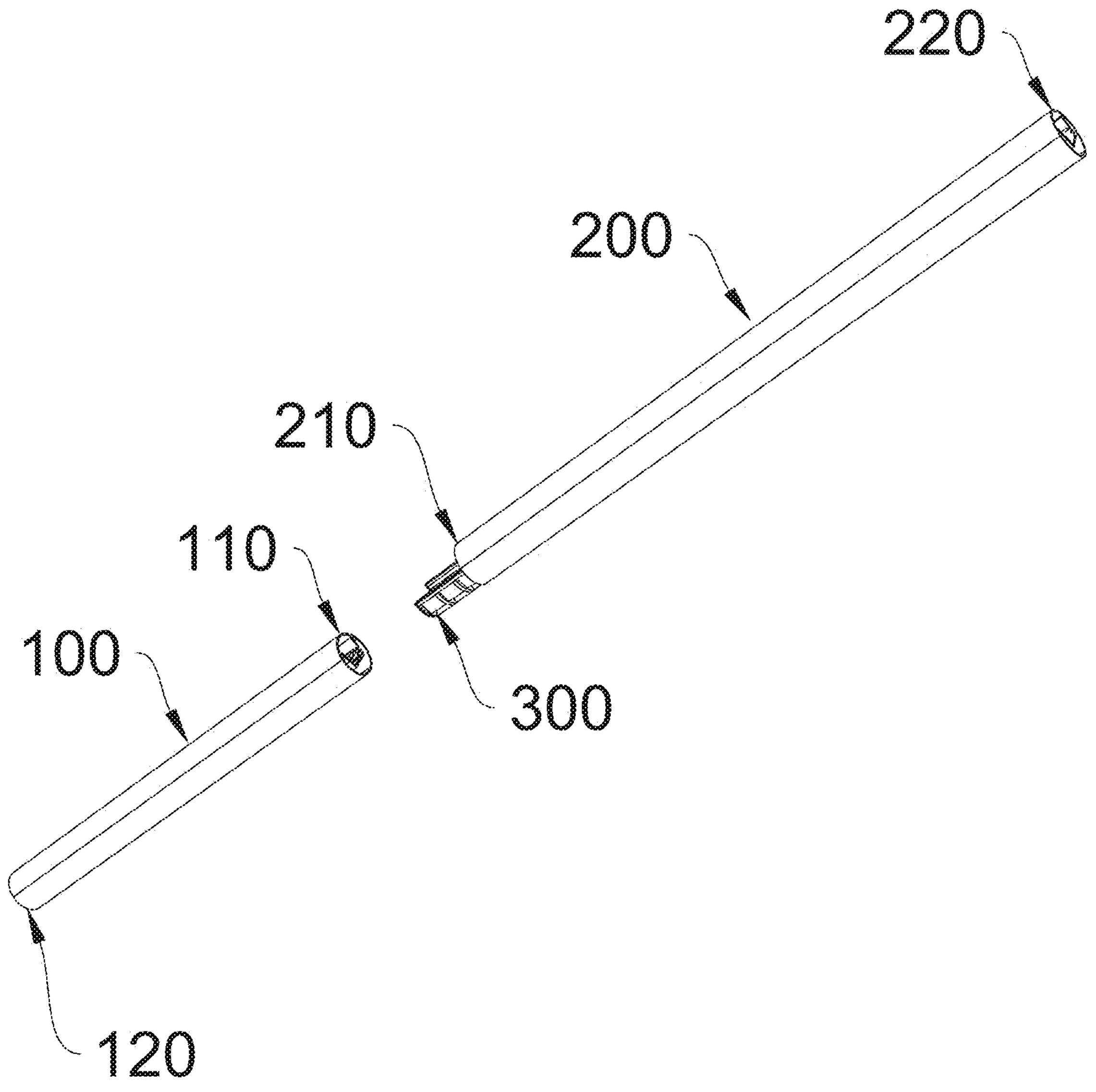
FIG. 3 is an exploded perspective view of a spliced lamp post according to an embodiment of the present application.

Referring to FIG. 1, this embodiment provides a lamp, including: a foldable lamp base 400 and a spliced lamp post that is detachably assembled with the foldable lamp base 400.

Referring to FIG. 2 to FIG. 8, the spliced lamp post includes: a first lamp rod 100, second lamp rods 200, and plug-in connectors 300.

Specifically, the first lamp rod 100 has a first end 110 and a second end 120. The first end 110 of the first lamp rod 100 is provided with a first electrical connector 111. Each second lamp rod 200 has a front end 210 and a rear end 220. The front end 210 of the second lamp rod 200 is provided with a second electrical connector 211. Each plug-in connector 300 has a first plug-in end 310 and a second plug-in end 320. The first plug-in end 310 of the plug-in connector 300 can be connected with the first end 110 of the first lamp rod 100, and the second plug-in end 320 of the plug-in connector 300 can be connected with the front end 210 of the second lamp rod 200. The first lamp rod 100 and the second lamp rods 200 are seamlessly spliced through the plug-in connectors 300, enabling the first end 110 of the first lamp rod 100 to get close to the front end 210 of the second lamp rod 200 to achieve splicing.

It should be noted that when the first lamp rod 100 and the second lamp rod 200 are seamlessly spliced through the plug-in connector 300, the first plug-in end 310 of the plug-in connector 300 is first connected with the first end 110 of the first lamp rod 100, and the second plug-in end 320 of the plug-in connector 300 is connected with the front end 210 of the second lamp rod 200. An external force is then applied to bring the first end 110 of the first lamp rod 100 closer to the front end 210 of the second lamp rod 200 until the first end 110 of the first lamp rod 100 abuts against the front end 210 of the second lamp rod 200, thereby completing the connection between the first lamp rod 100 and the second lamp rod 200 and achieving a seamless splicing effect. The spliced lamp post formed by seamless splicing through the method can not only enhance the integrity and attractiveness of the spliced lamp post, but also ensure a continuous light-emitting end face of the spliced lamp post, thereby improving the lighting effect of the spliced lamp post.

Since the spliced lamp post is assembled from the first lamp rod 100 and the second lamp rod 200, the first lamp rod 100 and the second lamp rod 200 can be disassembled when storing the spliced lamp post. This greatly reduces the storage volume of the spliced lamp post, facilitates the storage or packaging and transportation of the spliced lamp post, significantly reduces the transportation cost of the spliced lamp post, and avoids damage to the spliced lamp post during transportation.

Additionally, when the first end 110 of the first lamp rod 100 abuts against the front end 210 of the second lamp rod 200, the first electrical connector 111 is connected to the second electrical connector 211, enabling circuit conduction. This allows unified power supply and control of the first lamp rod 100 and the second lamp rod 200, so that the spliced lamp post can be powered and controlled through a single wire, thereby improving the usage convenience of the spliced lamp post.

Figure 7:
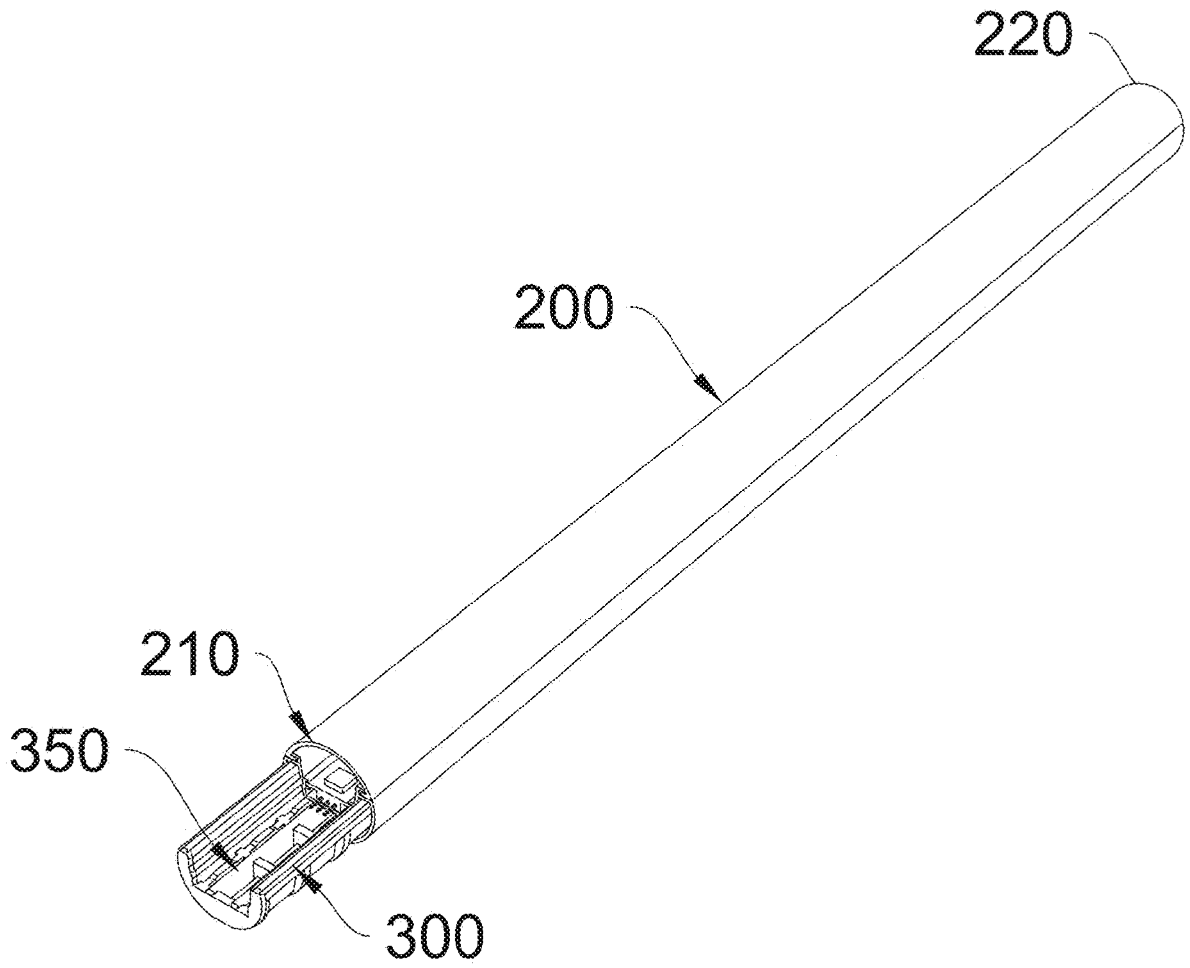
FIG. 7 is a perspective view of a second lamp rod and a plug-in connector according to an embodiment of the present application.
Figure 8:
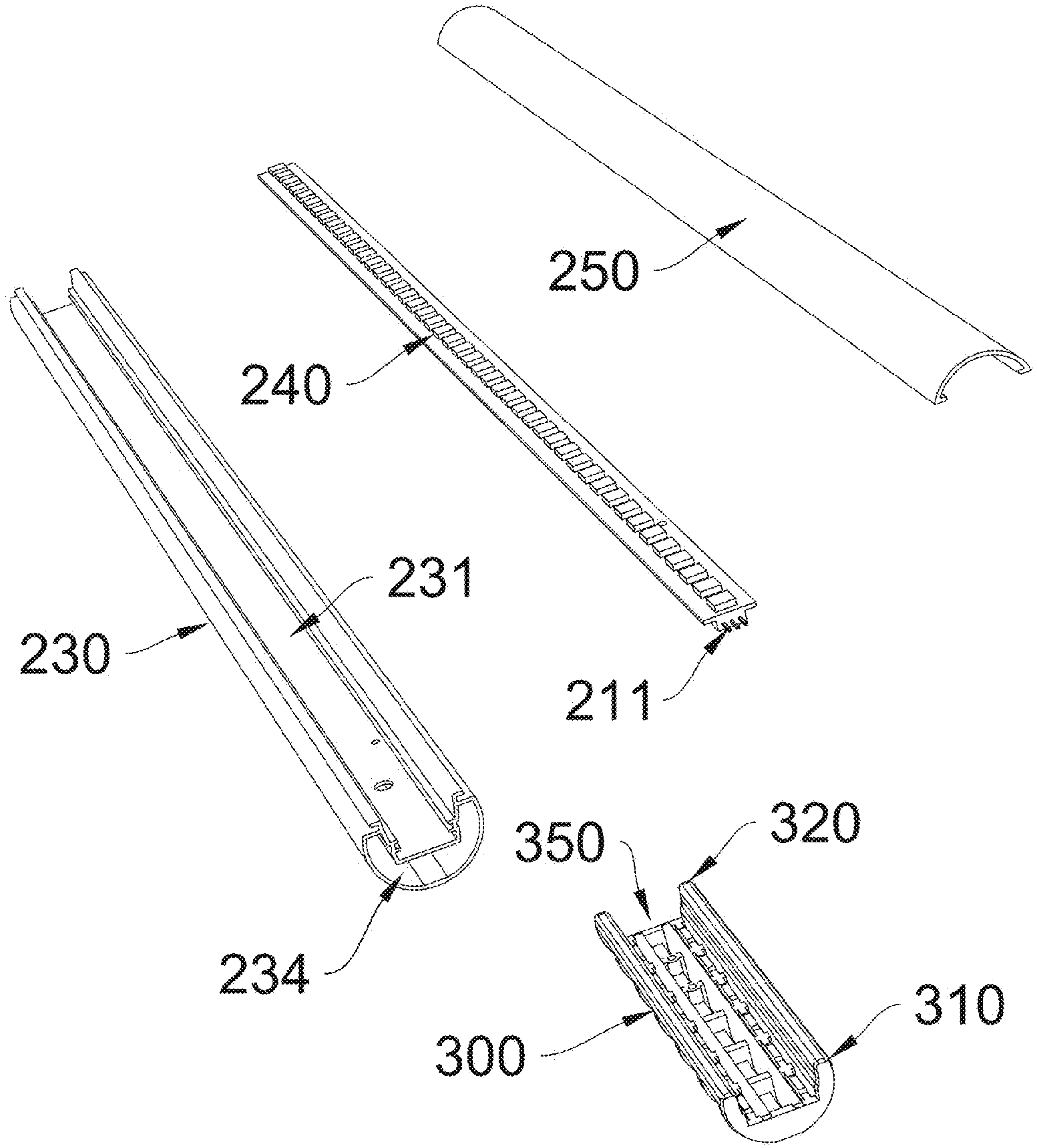
FIG. 8 is an exploded perspective view of a second lamp rod and a plug-in connector according to an embodiment of the present application.

In an embodiment, referring to FIG. 7 and FIG. 8, a first plug-in hole 112 is formed in the first end 110 of the first lamp rod 100. The second plug-in end 320 of the plug-in connector 300 is fixedly connected with the second lamp rod 200, enabling the plug-in connector 300 and the second lamp rod 200 to be integrated.

With the plug-in connector 300 arranged in this manner, during the splicing assembly of the first lamp rod 100 and the second lamp rod 200, the first plug-in end 310 of the plug-in connector 300 can be inserted into the first plug-in hole 112 directly through the second lamp rod 200, thereby enabling the first lamp rod 100 and the second lamp rod 200 to be spliced and simplifying the splicing operation. Moreover, this arrangement helps prevent the plug-in connector 300 from being lost, thereby improving the use experience of the lamp post.

Additionally, since the first lamp rod 100 and the second lamp rod 200 are seamlessly connected through the plug-in connector 300, and the second plug-in end 320 of the plug-in connector 300 is fixedly connected to the second lamp rod 200, the length of the plug-in connector 300 inserted into the first plug-in hole 112 can be effectively limited. This prevents uneven lengths of the plug-in connector 300 inserted into the first lamp rod 100 and the second lamp rod 200 caused by uneven force during the splicing assembly of the spliced lamp post, which could compromise the stability of the connection of the spliced lamp post. As a result, the splicing stability between the first lamp rod 100 and the second lamp rod 200 is further enhanced.

In an embodiment, a second plug-in hole 212 is formed in the front end 210 of the second lamp rod 200. The second plug-in end 320 of the plug-in connector 300 is inserted into the second plug-in hole 212 and is fixedly connected with an inner wall of the second plug-in hole 212 using a fastening screw, enabling the plug-in connector 300 and the second lamp rod 200 to be integrated, facilitating installation and use of the lamp post, and simplifying the splicing process for a user.

Alternatively, in other embodiments, the second plug-in end 320 of the plug-in connector 300 may also be fixedly connected with the inner wall of the second plug-in hole 212 in a snap-fit manner or by adhesive bonding. In other words, the second plug-in end 320 of the plug-in connector 300 only needs to be fixed to the second lamp rod 200. Accordingly, when splicing the first lamp rod 100 and the second lamp rod 200, the user can simply hold the second lamp rod 200 and insert the first plug-in end 310 of the plug-in connector 300 into the first plug-in hole 112 of the first lamp rod 100, and thus, the splicing of the first lamp rod 100 and the second lamp rod 200 is completed.

Definitely, in other embodiments, the first plug-in end 310 of the plug-in connector 300 may also be fixedly connected with the first end 110 of the first lamp rod 100, enabling the plug-in connector 300 and the first lamp rod 100 to be integrated. Accordingly, during the splicing assembly of the first lamp rod 100 and the second lamp rod 200, the second plug-in end 320 of the plug-in connector 300 can be inserted into the second plug-in hole 212 directly through the first lamp rod 100, allowing for easy splicing of the first lamp rod 100 and the second lamp rod 200, and ensuring a good splicing effect.

Figure 4:
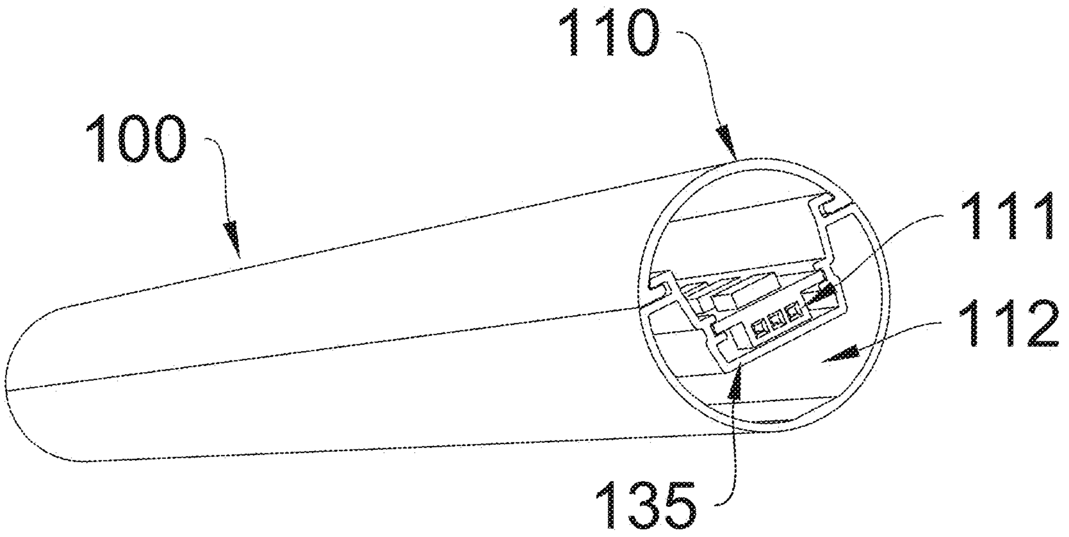
FIG. 4 is a perspective view of a first lamp rod according to an embodiment of the present application.
Figure 5:
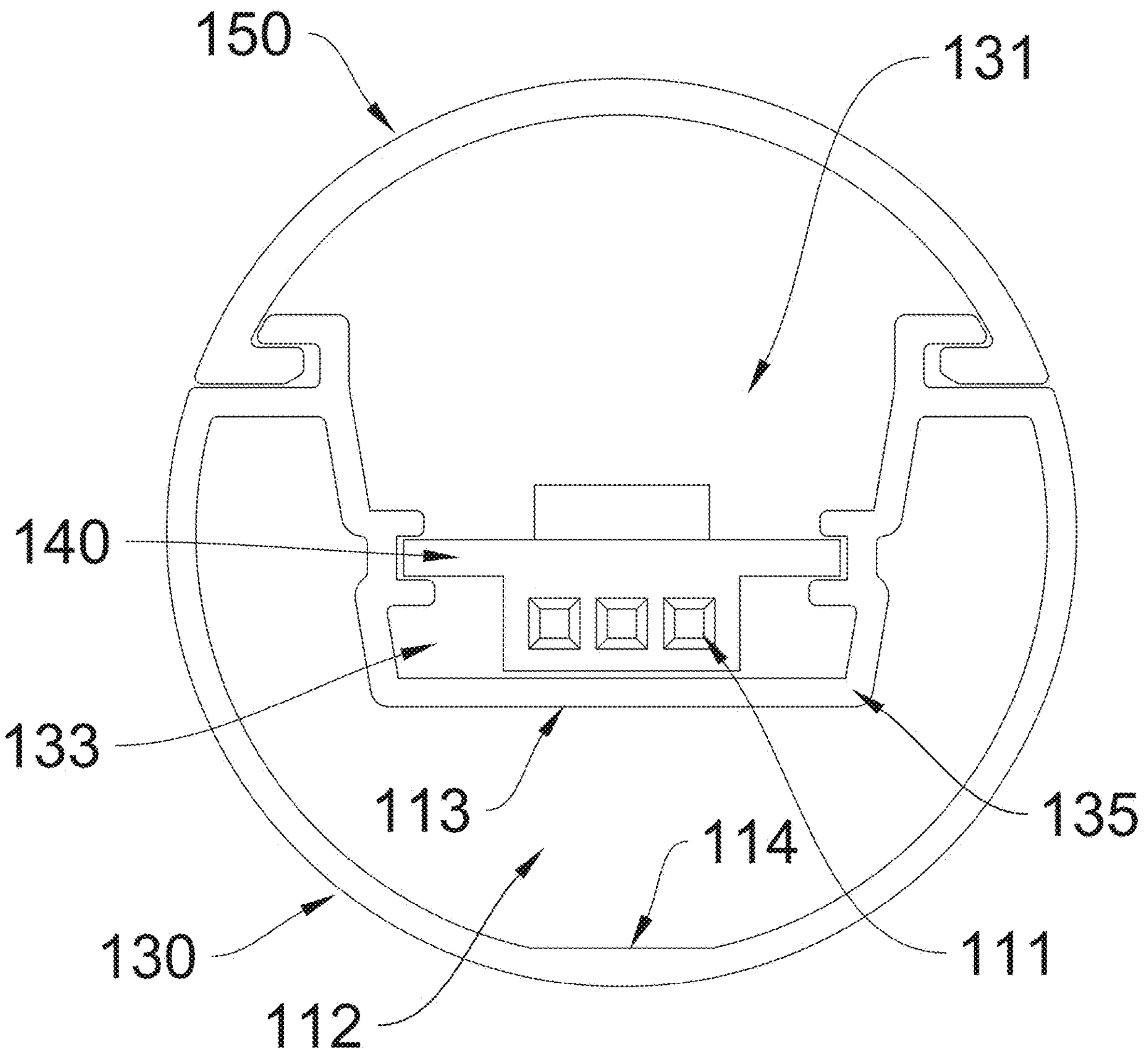
FIG. 5 is a perspective view of a first lamp rod from another perspective according to an embodiment of the present application.
Figure 6:
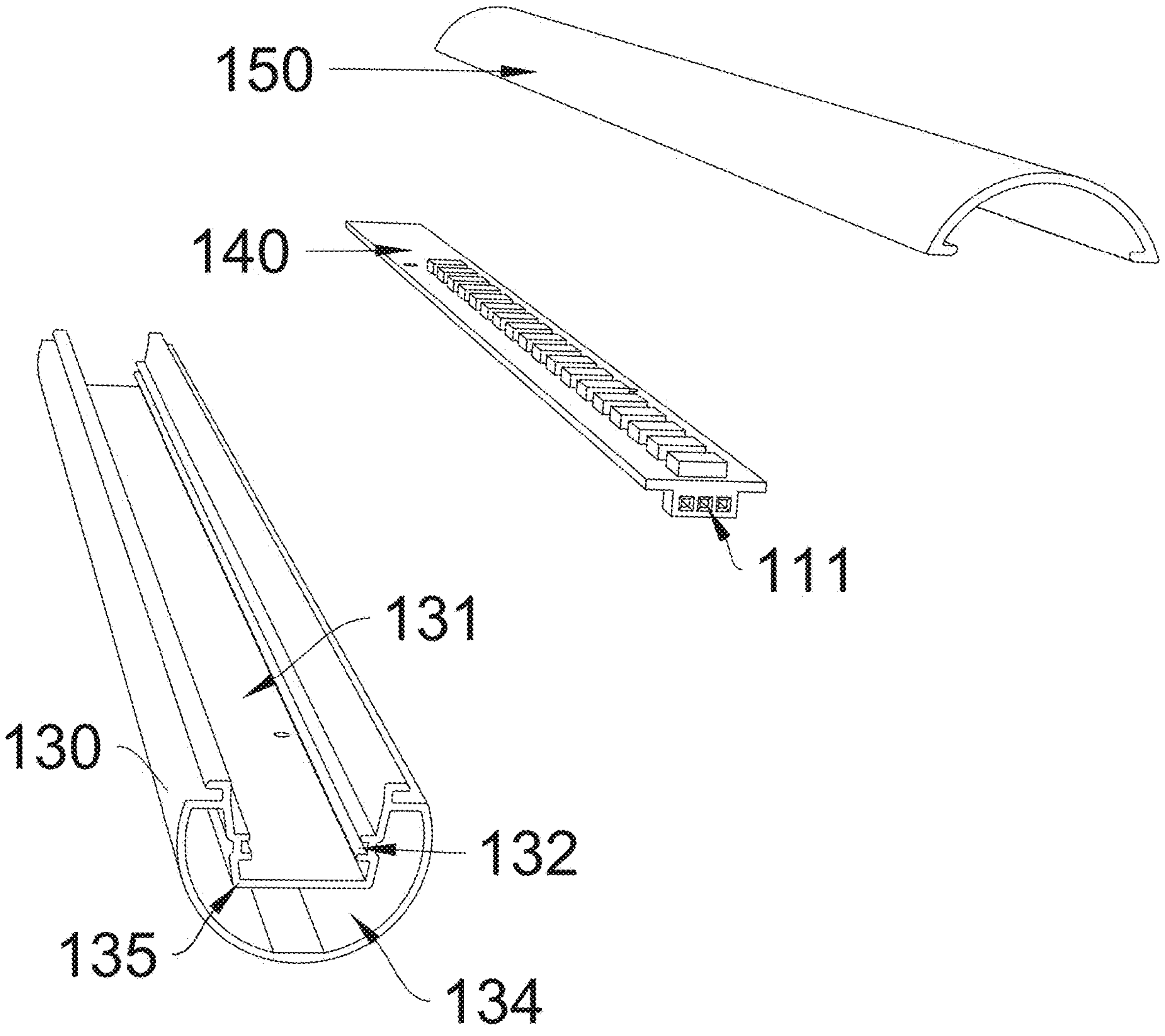
FIG. 6 is an exploded perspective view of a first lamp rod according to an embodiment of the present application.

In an embodiment, referring to FIG. 4, FIG. 5, and FIG. 6, the first lamp rod 100 includes: a first housing 130 and a first lamp panel 140. A first hollow channel 134 is arranged in the first housing 130, and an outer side of the first housing 130 is recessed inward to form a first mounting groove 131. The first lamp panel 140 is installed in the first mounting groove 131. The arrangement of the first mounting groove 131 not only facilitates the installation of the first lamp panel 140 but also limits and protects the first lamp panel 140, thereby preventing damage to the first lamp panel 140 from foreign objects that could affect the lighting effect.

In an embodiment, lamp panel sliding grooves 132 are symmetrically formed in a left side wall and a right side wall of the first mounting groove 131. A left end and a right end of the first lamp panel 140 are respectively matched with the lamp panel sliding grooves 132 in the left side wall and the right side wall of the first mounting groove 131, thereby limiting the first lamp panel 140 within the lamp panel sliding grooves 132, to securely fix the first lamp panel 140.

It should be noted that during the installation of the first lamp panel 140, one end of the first lamp panel 140 in a length direction is first aligned with the lamp panel sliding grooves 132, and the first lamp panel 140 is pushed to allow a left end and a right end of a part of the first lamp panel 140 to be inserted into the lamp panel sliding grooves 132. The first lamp panel 140 is then continuously pushed until the left end and the right end of the first lamp panel 140 are completely slid into the lamp panel sliding grooves 132, thereby completing the installation of the first lamp panel 140. By using the lamp panel sliding grooves 132 to install and limit the first lamp panel 140, the installation process of the lamp panel can be simplified, making the assembly process of the first lamp panel 140 simpler.

Definitely, in other embodiments, the first lamp panel 140 may also be fixedly installed in the first mounting groove 131 of the first housing 130 using fastening screws; or the first lamp panel 140 may be directly bonded to the bottom of the first mounting groove 131 of the first housing 130 to achieve a good installation effect. In other words, the first lamp panel 140 only needs to be fixedly installed in the first mounting groove 131, thereby allowing the first mounting groove 131 to provide a protection for the first lamp rod 100.

In an embodiment, a gap is formed between each lamp panel sliding groove 132 and the first mounting groove 131. By installing the first lamp panel 140 in the lamp panel sliding grooves 132, a heat dissipation channel 133 can be formed between the first lamp panel 140 and the first mounting groove 131, thereby improving a heat dissipation effect of the first lamp rod 100.

In an embodiment, when the first mounting groove 131 is formed in the first housing 130, an inner wall of the first hollow channel 134 protrudes to form a first boss 135, such that the cross section of the first hollow channel 134 is approximately in a U shape. In the first end 110 of the first lamp rod 100, the first hollow channel 134 forms the first plug-in hole 112 matched with the first plug-in end 310 of the plug-in connector 300. In other words, the first plug-in hole 112 is only a section of the first hollow channel 134, and the cross section of the first plug-in hole 112 is also approximately in a U shape. The plug-in connector 300 is provided with a plug-in slot 350. When the plug-in connector 300 is connected with the first lamp rod 100, the plug-in slot 350 accommodates the first boss 135 within the first hollow channel 134, ensuring a tight fit between the plug-in connector 300 and the first housing 130. Obviously, in the assembly process of the plug-in connector 300 and the first housing 130, the fit between the plug-in slot 350 and the first boss 135 can prevent relative circumferential movement of the plug-in connector 300 relative to the first housing 130, thereby improving the assembly stability of the plug-in connector 300 and the first housing 130.

Figure 9:
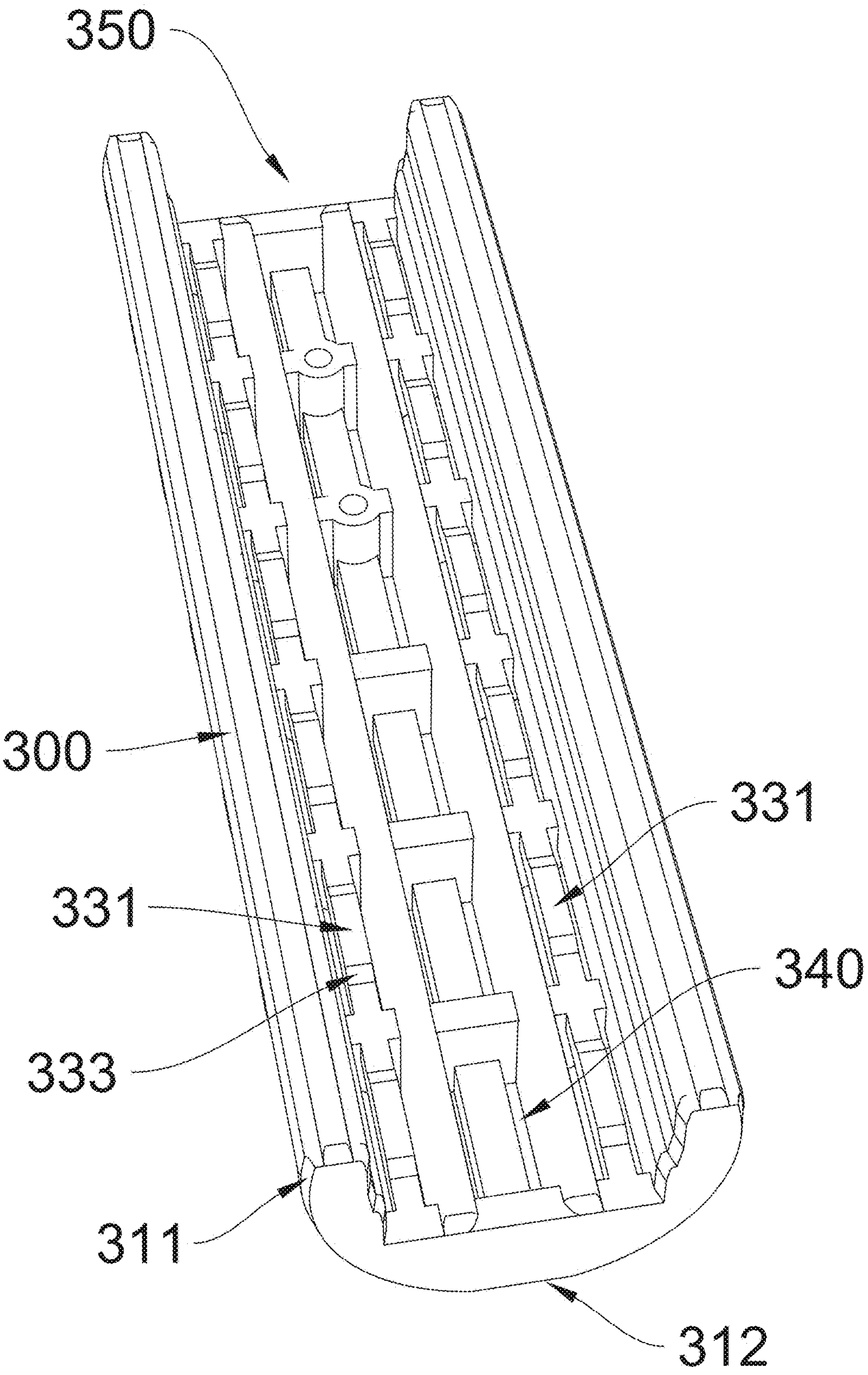
FIG. 9 is a perspective view of a plug-in connector according to an embodiment of the present application.
Figure 10:
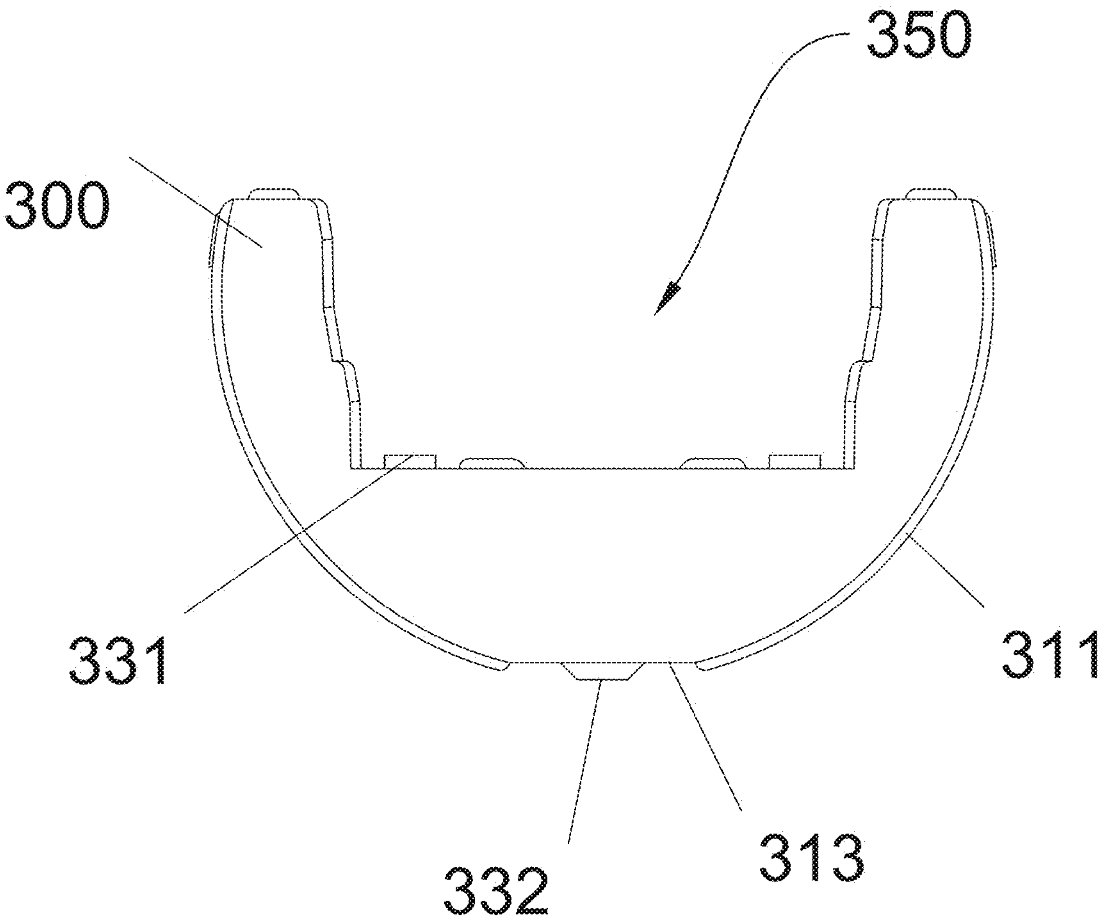
FIG. 10 is a perspective view of a plug-in connector from another perspective according to an embodiment of the present application.
Figure 11:
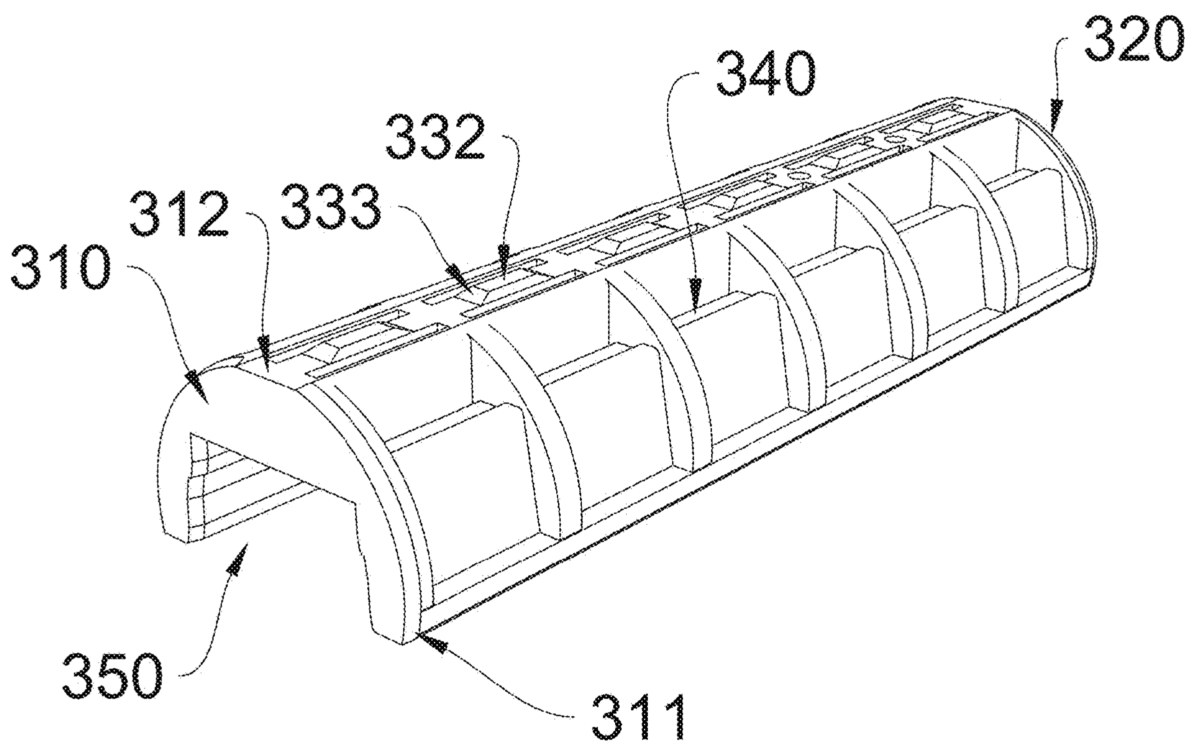
FIG. 11 is a perspective view of a plug-in connector from another perspective according to an embodiment of the present application.

In an embodiment, referring to FIG. 9, FIG. 10, and FIG. 11, a limiting protrusion is arranged on a peripheral side of the plug-in connector 300. When the first plug-in end 310 of the plug-in connector 300 is inserted into the first plug-in hole 112, the limiting protrusion abuts against an inner wall of the first plug-in hole 112, thereby limiting the first plug-in end 310 of the plug-in connector 300 within the first plug-in hole 112.

It should be noted that the limiting protrusion protrudes from a side wall of the plug-in connector 300. This not only reduces the contact area between the plug-in connector 300 and the inner wall of the first plug-in hole 112, making it easier for the first plug-in end 310 of the plug-in connector 300 to be inserted into the first plug-in hole 112, but also allows, after the assembly of the first housing 130 and the plug-in connector 300, the limiting protrusion to generate an extrusion force along a protruding direction on the inner wall of the first plug-in hole 112, resulting in a reverse extrusion force on the inner wall of the first plug-in hole 112, thereby firmly pressing the first plug-in end 310 of the plug-in connector 300 against the inner wall of the first plug-in hole 112 and ensuring the assembly stability of the first housing 130 and the plug-in connector 300. In other words, the arrangement of the limiting protrusion can reduce the resistance in the insertion process while ensuring the assembly stability of the first housing 130 and the plug-in connector 300, enabling the first lamp rod 100 and the plug-in connector 300 to be spliced easier.

In an embodiment, the plug-in slot 350 is located in an upper side of the plug-in connector 300. The limiting protrusion includes: first limiting protrusions 331, which are arranged at the bottom of the plug slot 350 and protrude upward. When the first plug-in end 310 of the plug-in connector 300 is inserted into the first plug-in hole 112, the first limiting protrusions 331 abut against a first side wall 113 of the first plug-in hole 112, thereby limiting the first plug-in end 310 of the plug-in connector 300 within the first plug-in hole 112.

In an embodiment, based on the arrangement of the first limiting protrusions 331 on the plug-in connector 300, the limiting protrusion further includes: a second limiting protrusion 332, which is arranged on a lower side of the plug-in connector 300 and protrudes downward. When the second plug-in end 320 of the plug-in connector 300 is inserted into the first plug-in hole 112, the first limiting protrusions 331 abut against a second side wall 114 of the first plug-in hole 112, thereby limiting the first plug-in end 310 of the plug-in connector 300 within the first plug-in hole 112.

It is worth noting that the first limiting protrusions 331 and the second limiting protrusion 332 both protrude from an outer wall of the first plug-in end 310, which can simultaneously reduce the contact areas between upper and lower sides of the plug-in connector 300 and the inner wall of the first plug-in hole 112, further making it easier for the plug-in connector 300 to be inserted into the first plug-in hole 112. Meanwhile, the upward protrusion of the first limiting protrusions 331 exerts an extrusion force on the first side wall 113 of the first plug-in hole 112, causing the first side wall 113 of the first plug-in hole 112 to exert a downward reverse extrusion force. Similarly, the downward protrusion of the second limiting protrusion 332 exerts an extrusion force on the second side wall 114 of the first plug-in hole 112, causing an upward reverse extrusion force on the plug-in connector 300 from the second side wall 114 of the first plug-in hole 112. The combined effect of the downward and upward reverse extrusion forces forms a clamping and limiting effect on the first plug-in end 310 inserted into the first plug-in hole 112, thereby further improving the splicing stability of the first lamp rod 100 and the second lamp rod 200. In other embodiments, the first limiting protrusions 331 or the second limiting protrusion 332 may be provided alone.

In an embodiment, the first lamp rod 100 further includes: a first light-transmitting lampshade 150. The first light-transmitting lampshade 150 is installed on the first housing 130 and is located on an outer side of the first lamp panel 140. The first light-transmitting lampshade 150 and the first housing 130 enclose to form a cylindrical shape, making the appearance of the first lamp rod 100 more attractive.

In an embodiment, a first positioning plane 312 is arranged on the lower side of the plug-in connector 300. When the plug-in connector 300 is inserted into the first plug-in hole 112, the first positioning plane 312 abuts against the second side wall 114 of the plug-in hole, thereby further limiting the circumferential rotation of the plug-in connector 300 within the first plug-in hole 112. This helps prevent the relative rotation between the first lamp rod 100 and the second lamp rod 200 during and after splicing, ensuring the connection stability of the first electrical connector 111 and the second electrical connector 211 and the consistency of the lighting direction of the spliced lamp post.

In an embodiment, the first plug-in end 310 of the plug-in connector 300 is provided with a hollow hole 340, allowing the first plug-in end 310 of the plug-in connector 300 to have better elasticity. When the first plug-in end 310 of the plug-in connector 300 is inserted into the first plug-in hole 112, the limiting protrusion protruding from the peripheral side of the first plug-in end 310 can be extruded and deformed by the inner wall of the first plug-in hole 112, allowing the first plug-in end 310 to easily enter the first plug-in hole 112, thereby making the plug-in process smoother.

In an embodiment, limiting guide slopes 333 are arranged at an outer end of the limiting protrusion, allowing for a smooth transition between the surface of the plug-in connector 300 and the limiting protrusion. When the first plug-in end 310 of the plug-in connector 300 is inserted into the first plug-in hole 112, the limiting guide slopes 333 can guide the limiting protrusion to be smoothly inserted into the first plug-in hole 112, making the operation easier and more convenient.

In an embodiment, a plug-in guide slope 311 is arranged at the first plug-in end 310 of the plug-in connector 300. The plug-in guide slope 311 can reduce the size of an end portion of the first plug-in end 310 and guide the first plug-in end 310 of the plug-in connector 300 to be inserted into the first plug-in hole 112, thereby achieving a smooth and easy plug-in effect and optimizing the splicing experience of the lamp post.

In an embodiment, referring to FIG. 5, FIG. 6, and FIG. 8, the first electrical connector 111 is designed as an electrical connection socket, and the second electrical connector is designed as an electrical connection pin. When the first end 110 of the first lamp rod 100 abuts against the front end 210 of the second lamp rod 200, the electrical connection pin is inserted into the electrical connection socket, thereby achieving an electrical connection between the first lamp rod 100 and the second lamp rod 200.

In an embodiment, the electrical connection pin is arranged between a lamp panel and a housing of the second lamp rod 200, and the length of the electrical connection pin is shorter than that of the first plug-in end 310 of the plug-in connector 300. This allows the plug-in connector 300 to effectively protect the electrical connection pin on the inner side, preventing the electrical connection pin from deformation or breakage that could influence the electrical connection effect between the lamp rods.

Figure 13:
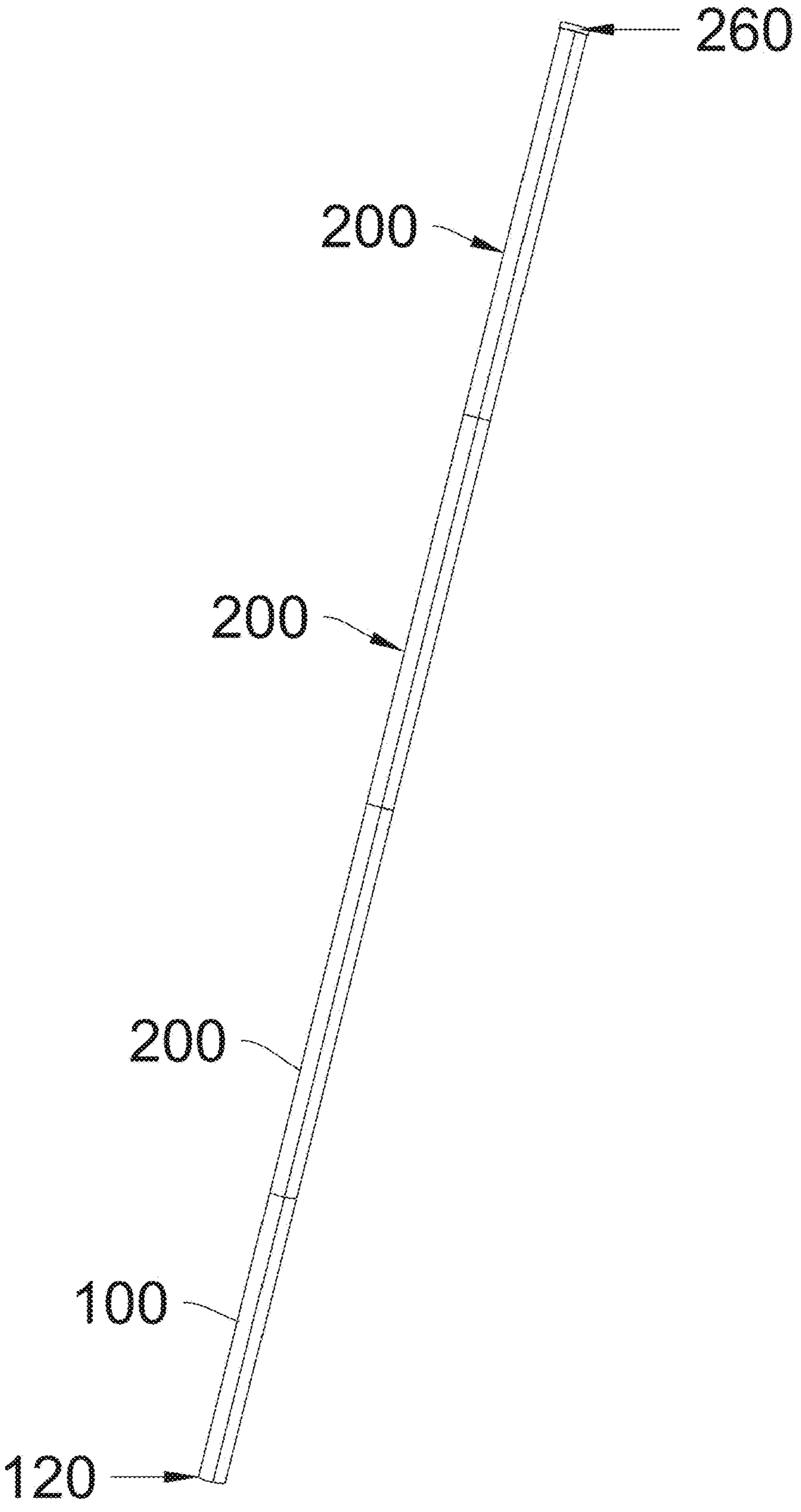
FIG. 13 is a perspective view of a spliced lamp post according to an embodiment of the present application.
Figure 14:
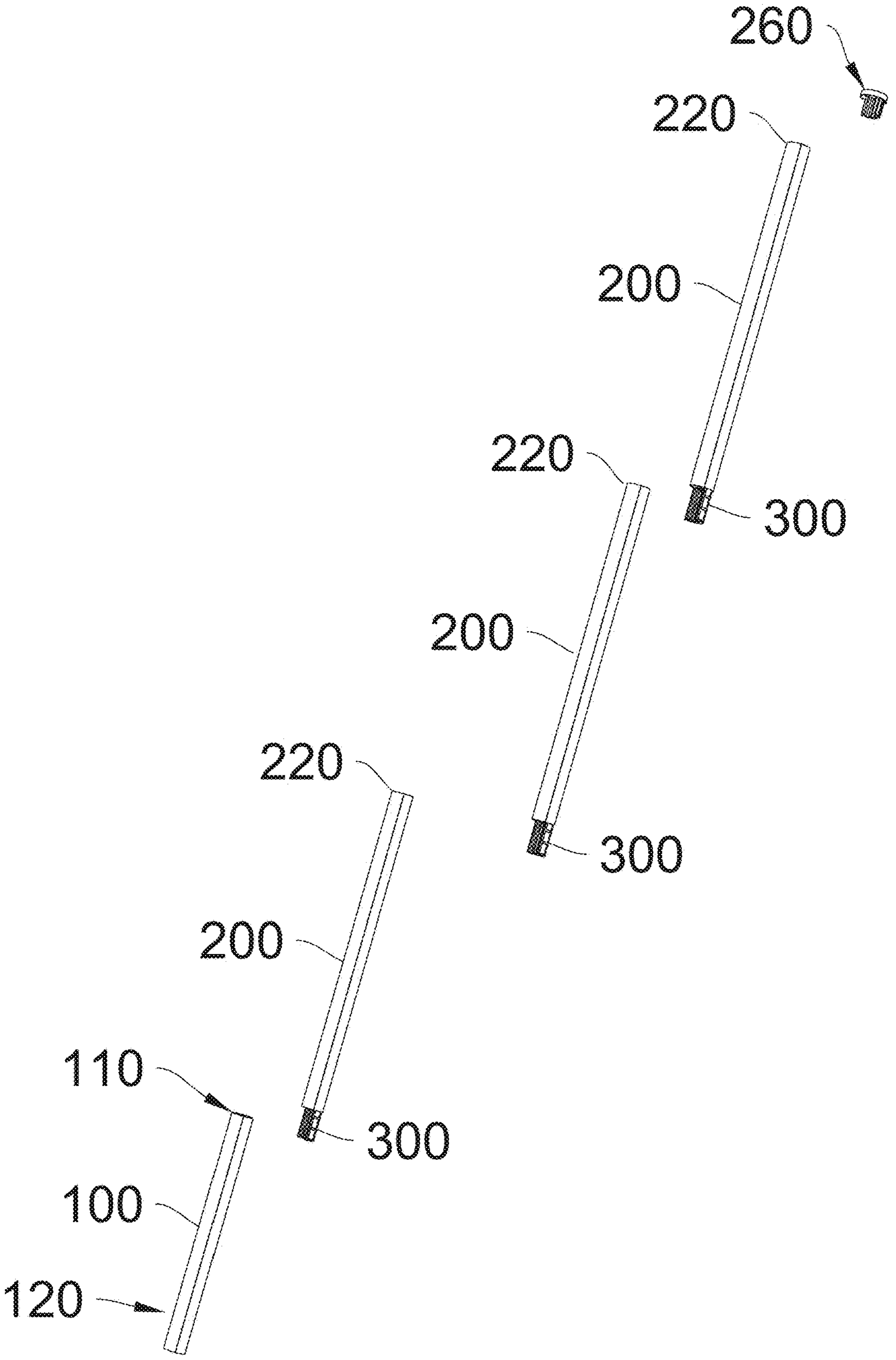
FIG. 14 is an exploded perspective view of a spliced lamp post according to an embodiment of the present application.

In an embodiment, referring to FIG. 13 and FIG. 14, a plurality of sets of second lamp rods 200 are arranged, and the number of the plug-in connectors 300 is the same as the number of the second lamp rods 200. This enables the overall spliced lamp post to be further disassembled, optimizing the storage and packaging volume of the spliced lamp post and reducing packaging and transportation costs. A third electrical connector 221 is arranged at the rear end 220 of the second lamp rod 200. The rear end 220 of the second lamp rod 200 and the front end 210 of the adjacent second lamp rod 200 can be seamlessly spliced through the plug-in connector 300. When the rear end 220 of the second lamp rod 200 abuts against the front end 210 of the adjacent second lamp rod 200, the second electrical connector 211 and the third electrical connector 221 are connected and circuit conduction is activated, thereby achieving a good splicing effect.

Figure 12:
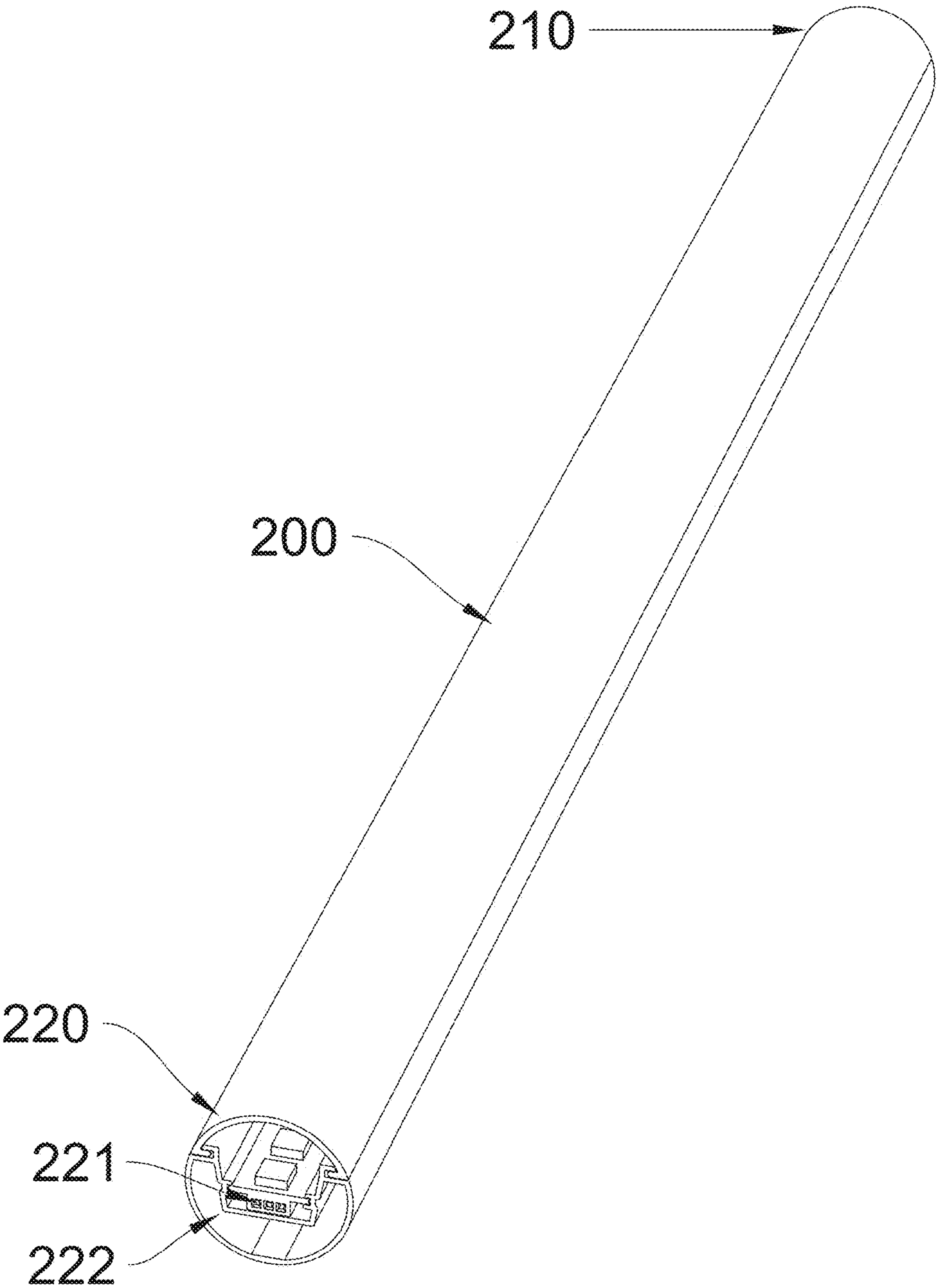
FIG. 12 is a perspective view of a second lamp rod according to an embodiment of the present application.

Specifically, referring to FIG. 12, the rear end 220 of the second lamp rod 200 is provided with a third plug-in hole 222, and the structure of the third plug-in hole 222 is the same as that of the first plug-in hole 112. The second plug-in end 320 of the plug-in connector 300 is connected with the front end 210 of the second lamp rod 200, and the first plug-in end 310 of the plug-in connector 300 can be inserted into the third plug-in hole 222 in the rear end 220 of the adjacent second lamp rod 200, thereby achieving the splicing of the two adjacent second lamp rods 200.

In an embodiment, referring to FIG. 8, the structure of the second lamp rod 200 is similar to that of the first lamp rod 100. Specifically, the second lamp rod 200 includes: a second housing 230 and a second lamp panel 240. A second hollow channel 234 is arranged in the second housing 230, and an outer side of the second housing 230 is recessed inward to form a second mounting groove 231, and the second lamp panel 240 is installed in the second mounting groove 231. The arrangement of the second mounting groove 231 can not only facilitate the installation of the second lamp panel 240 but also limit and protect the second lamp panel 240, thereby preventing damage to the second lamp panel 240 from foreign objects that could affect the lighting effect.

In an embodiment, the second lamp rod 200 further includes: a second light-transmitting lampshade 250. The second light-transmitting lampshade 250 is installed on the second housing 230 and is located on an outer side of the second lamp panel 240. The second light-transmitting lampshade 250 and the second housing 230 enclose to form a cylindrical shape, making the appearance of the second lamp rod 200 more attractive.

In an embodiment, an end portion of the first light-transmitting lampshade 150 is flush with an end portion of the first housing 130, and an end portion of the second light-transmitting lampshade 250 is flush with an end portion of the second housing 230. When the first lamp rod 100 and the second lamp rod 200 are spliced through the plug-in connector 300, the end portion of the second light-transmitting lampshade 250 can also abut against the light-transmitting lampshade of the second lamp rod 200, thereby achieving a seamless splicing and a continuous light-transmitting surface for the lighting effect.

In an embodiment, referring to FIG. 1, FIG. 13, and FIG. 14, the lamp post further includes a top cover 260. The top cover 260 may be inserted into the rear end 220 of the last second lamp rod 200 on the lamp post to shield the rear end 220 of the last second lamp rod 200, thereby preventing the foreign objects from entering the interior of the lamp post or light leakage that could affect the lighting effect.

Figure 15:
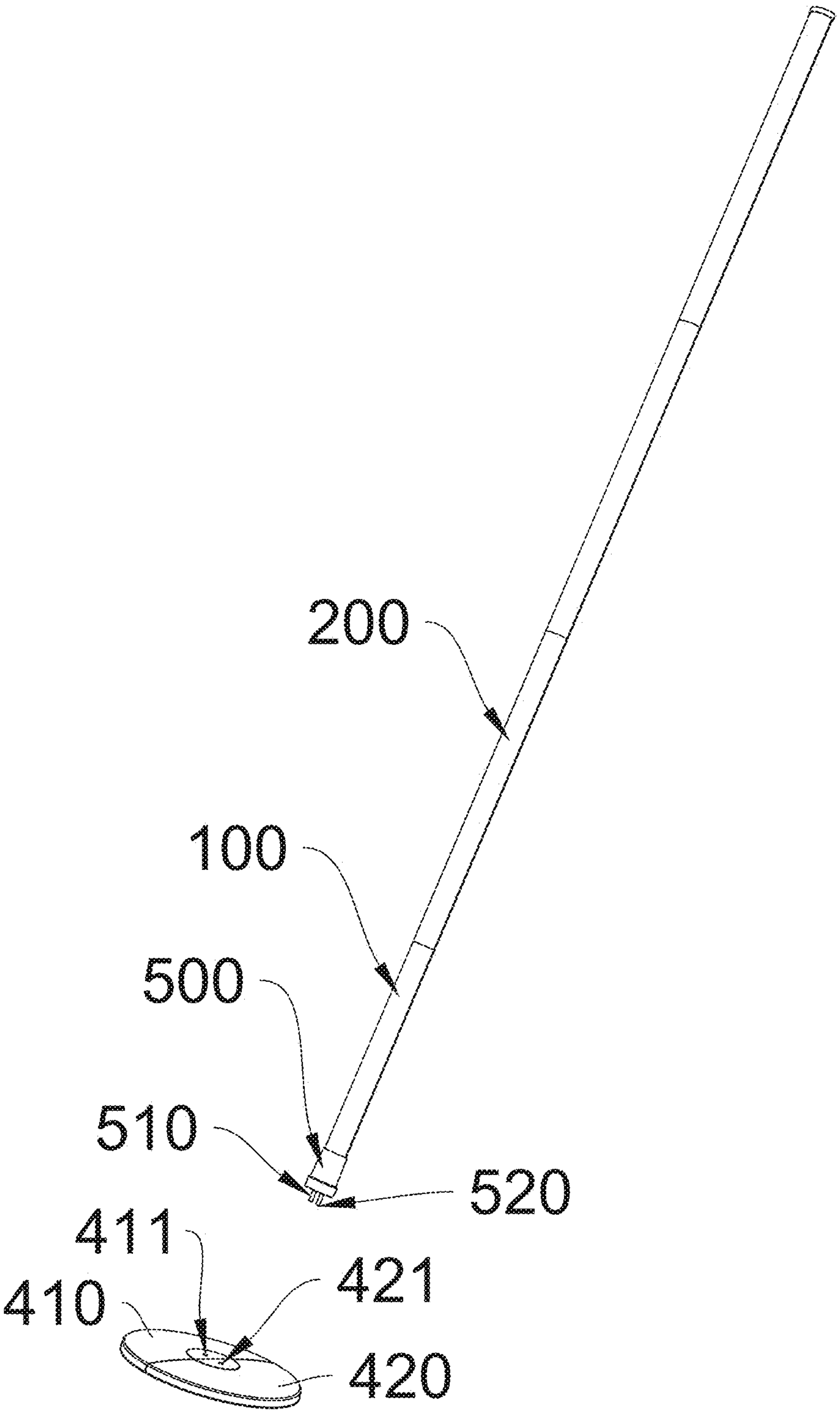
FIG. 15 is an exploded perspective view of a lamp according to an embodiment of the present application.
Figure 16:
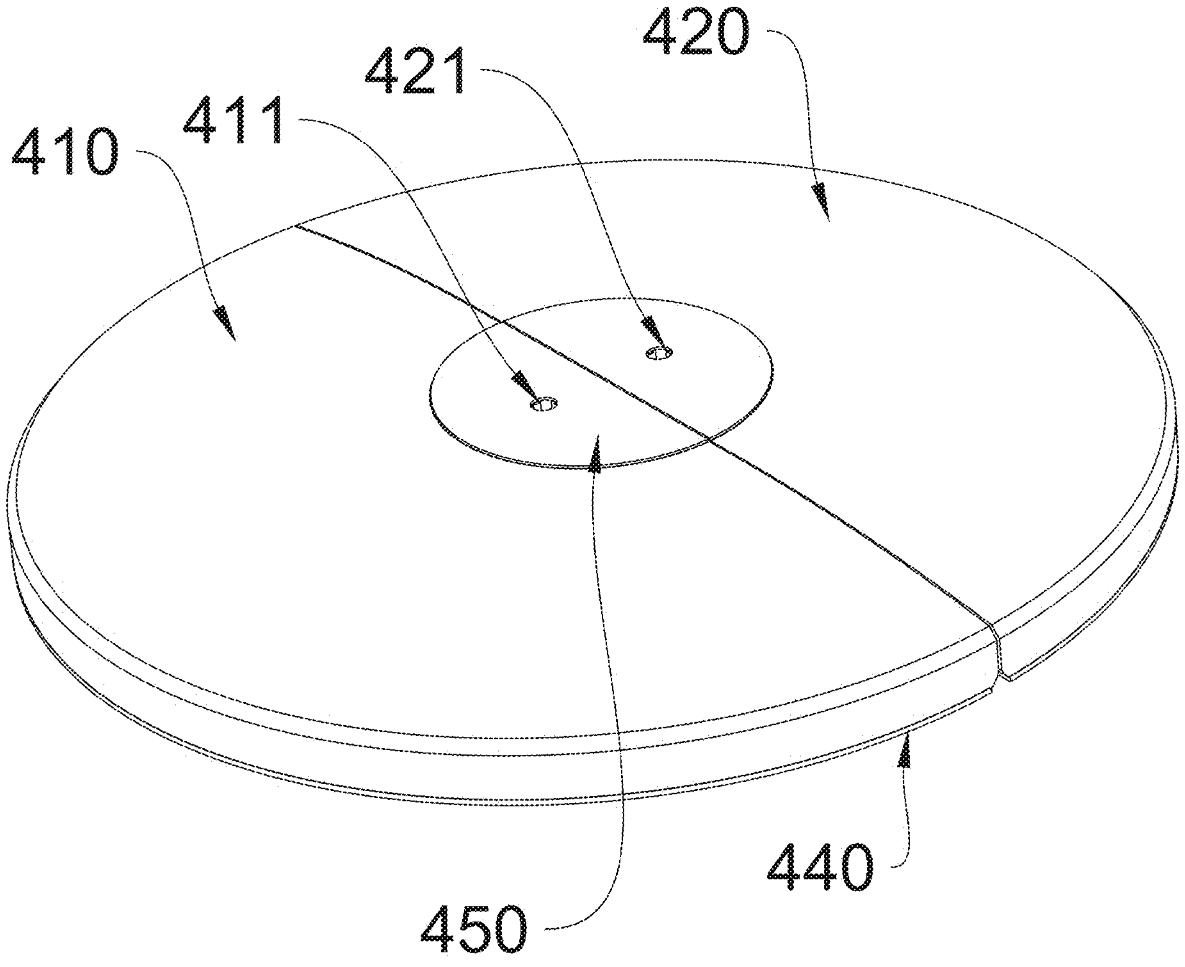
FIG. 16 is a perspective view of a foldable base according to an embodiment of the present application.
Figure 17:
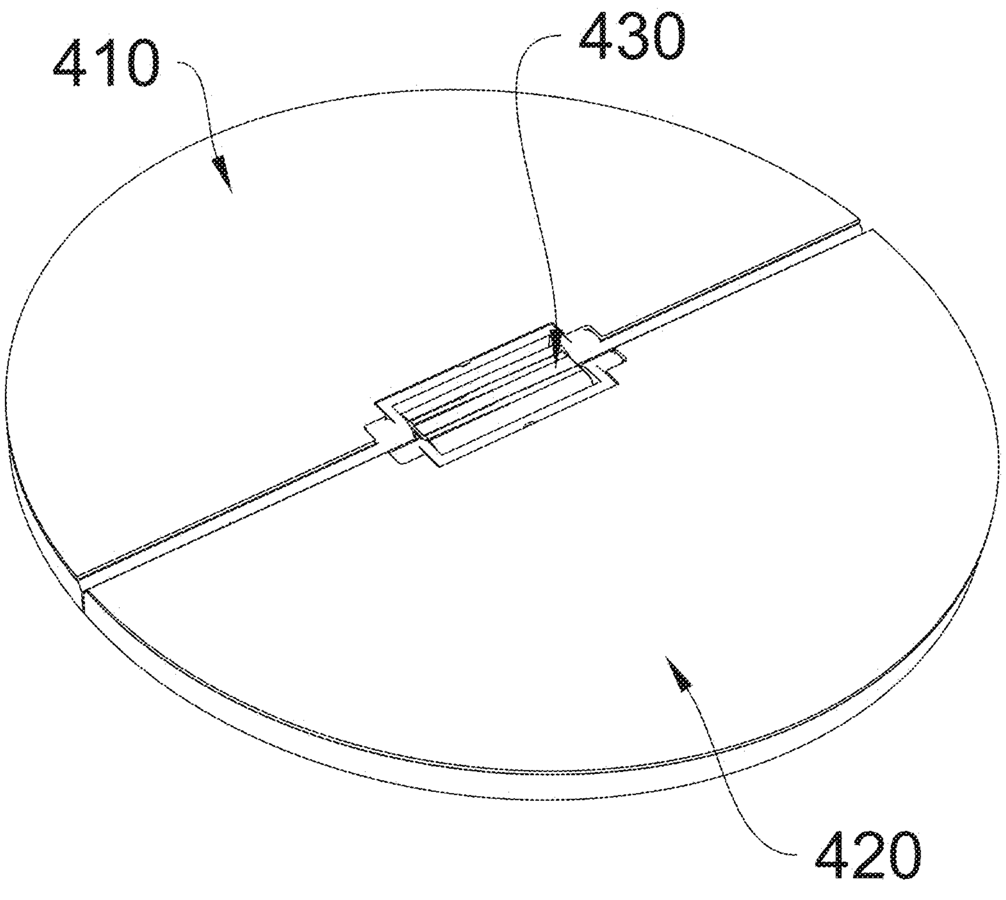
FIG. 17 is a perspective view of a foldable base from another perspective according to an embodiment of the present application.

Referring to FIG. 15, FIG. 16, and FIG. 17, the foldable lamp base 400 includes: a first bottom plate 410 and a second bottom plate 420. The first bottom plate 410 and the second bottom plate 420 are connected through a hinge mechanism 430, thereby allowing the first bottom plate 410 and the second bottom plate 420 to rotate relative to each other through the hinge mechanism 430, and then achieving unfolding and folding of the first bottom plate 410 and the second bottom plate 420. Folding the first bottom plate 410 and the second bottom plate 420 can greatly reduce the storage volume and lower the packaging and transportation costs of the lamp.

The first bottom plate 410 is provided with a first fixing hole 411, and the second bottom plate 420 is provided with a second fixing hole 421. The second end 120 of the first lamp rod 100 is provided with a connecting member, and a connector 500 is provided with a first fixing post 510 and a second fixing post 520. The first fixing post 510 is inserted into the first fixing hole 411, and the second fixing post 520 is inserted into the second fixing hole 421, achieving the connection between the spliced lamp post and the lamp base. Meanwhile, the relative rotation of the first bottom plate 410 and the second bottom plate 420 is limited, thereby allowing the first bottom plate 410 and the second bottom plate 420 to maintain a stable unfolded state. This ensures good stability when the foldable base is in use, thereby guaranteeing the lighting effect of the lamp. By pulling the first fixing post 510 out of the first fixing hole 411 and the second fixing post 520 out of the second fixing hole 421, the foldable lamp base 400 can be disassembled from the spliced lamp post, thereby reducing the overall storage and packaging volume of the lamp. Meanwhile, the limitation on the unfolded state of the foldable base 400 is released, thereby allowing the foldable base to be folded for storage.

It should be noted that one or more first fixing holes 411 may be provided, and the number of the first fixing posts 510 is the same as that of the first fixing holes 411. One or more second fixing holes 421 may be provided, and the number of the second fixing posts 520 is the same as that of the second fixing holes 421. This ensures the connection between the spliced lamp post and the foldable lamp base 400, while maintaining the unfolded state of the foldable lamp base 400.

In an embodiment, the first fixing hole 411 and the second fixing hole 421 are the same in size, shape, and number, and are symmetrically arranged relative to the hinge mechanism 430. The first fixing post 510 and the second fixing post 520 are the same in size, shape, and number. In this way, when connecting the spliced lamp post and the foldable lamp base 400, this design eliminates the need to distinguish between the first fixing post 510 and the second fixing post 520, thereby allowing for a quick connection process and more convenient use.

Figure 18:
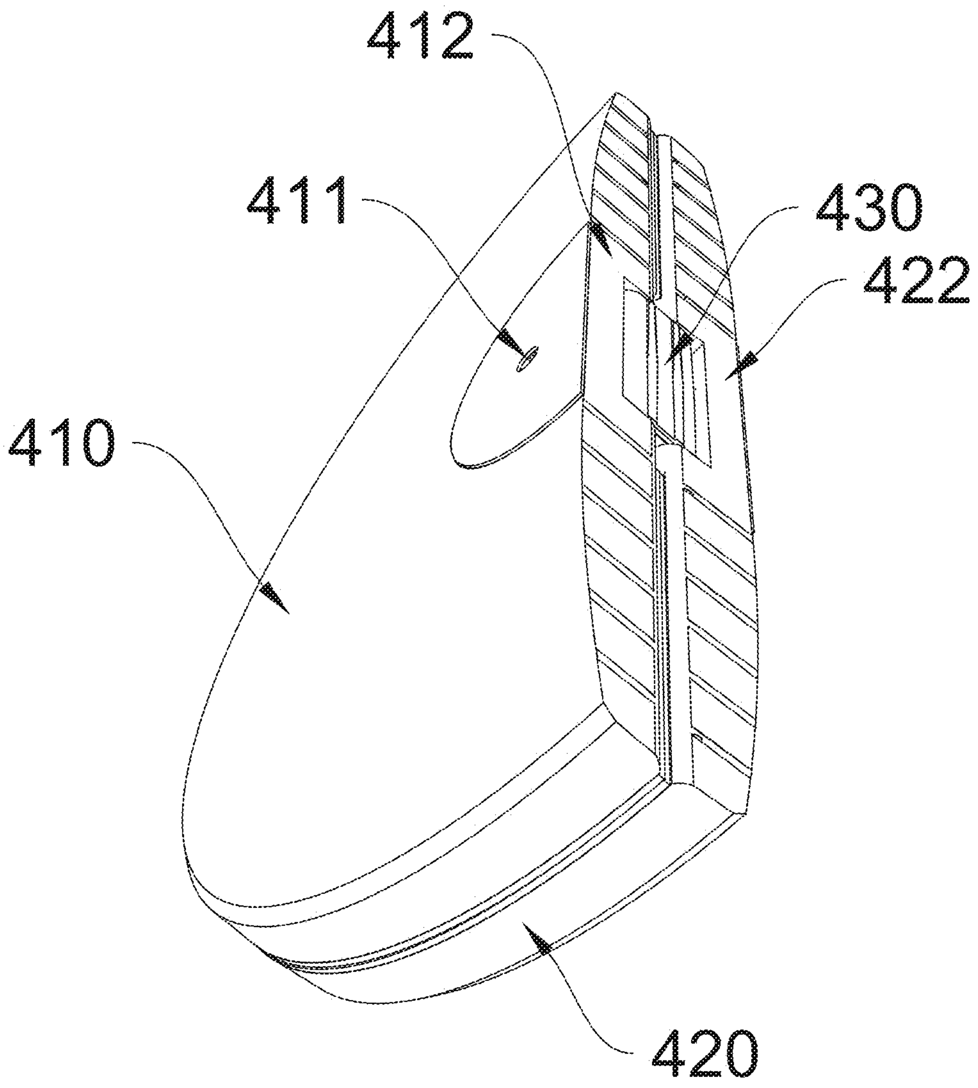
FIG. 18 is a perspective view of a foldable base in another state according to an embodiment of the present application.

In an embodiment, referring to FIG. 18, the first bottom plate 410 is provided with a first side surface 412, and the second bottom plate 420 is provided with a second side surface 422. The hinge mechanism 430 is arranged between the first side surface 412 and the second side surface 422, thereby achieving the rotational connection between the first bottom plate 410 and the second bottom plate 420. When unfolded, the first bottom plate 410 and the second bottom plate 420 form a flat mounting surface for installation of the lamp post. The first side surface 412 abuts against the second side surface 422, thereby maintaining the unfolding stability of the first bottom plate 410 and the second bottom plate 420.

In an embodiment, referring to FIG. 18, when the foldable lamp base 400 is stored, the first bottom plate 410 can be rotated and folded to the bottom of the second bottom plate 420, thereby minimizing the storage volume of the folded bottom plate. Meanwhile, when the first bottom plate 410 is rotated and folded to the bottom of the second bottom plate 420, the first side surface 412 is parallel to the second side surface 422, allowing the foldable base to be placed using the first side surface 412 and the second side surface 422. Definitely, in other embodiments, it may also allow that the first bottom plate 410 can be rotated and folded to the top of the second bottom plate 420, which can also achieve a good folding and storage effect.

In an embodiment, the first bottom plate 410 and the second bottom plate 420 are symmetrically arranged relative to the hinge mechanism 430, meaning that the first bottom plate 410 and the second bottom plate 420 are the same in shape and size. When the folded bottom plate is unfolded for installation, the forces on two sides of the first bottom plate 410 and the second bottom plate 420 are balanced, providing better stability for the foldable lamp base 400. When the foldable base is folded for storage, the first bottom plate 410 is folded to the bottom of the second bottom plate 420, and a bottom surface of the first bottom plate 410 can completely overlap with a bottom surface of the second bottom plate 420, thereby improving the storage effect of the foldable base.

In other embodiments, the foldable lamp base 400 may further include a third bottom plate. The third bottom plate is provided with a third fixing hole, and the connecting member is also provided with a third fixing post. The first bottom plate 410 and the third bottom plate are respectively hinged to two sides of the second bottom plate 420. When the foldable lamp base 400 is unfolded for use, the first bottom plate 410 and the third bottom plate can be respectively unfolded on a left side and a right side of the second bottom plate 420, the first fixing post 510 is inserted into the first fixing hole 411, the second fixing post 520 is inserted into the second fixing hole 421, and a third lamp post is inserted into the third fixing hole, thereby achieving the connection between the spliced lamp post and the lamp base. This allows the foldable lamp base 400 to maintain in the stable unfolded stable, providing good stability during use of the foldable base, and ensuring the use effect of the lamp.

The arrangement of the third bottom plate further increases the unfolded area of the foldable lamp base 400, thereby enhancing usage stability of the foldable lamp base 400. When the foldable lamp base 400 is folded for storage, the first bottom plate 410 and the third bottom plate are respectively folded toward the second bottom plate 420, thereby reducing the storage volume of the foldable lamp base 400.

In an embodiment, when the foldable lamp base 400 is stored, the first bottom plate 410 can be rotated and folded to the bottom of the second bottom plate 420, and the third bottom plate can be rotated and folded to the top of the second bottom plate 420, such that the folding of the first bottom plate 410 and the folding of the third bottom plate do not interfere with each other, thereby greatly minimizing the storage volume of the folded bottom plate. Definitely, in other embodiments, when the foldable lamp base 400 is stored, the first bottom plate 410 is rotated and folded to the bottom of the second bottom plate 420, and the third bottom plate is also rotated and folded to the bottom of the second bottom plate 420, thereby reducing the folding volume of the foldable lamp base 400, and achieving a good storage effect.

In an embodiment, a first anti-slip pad 440 is arranged at the bottom of the foldable lamp base 400 to prevent the foldable lamp base 400 from sliding when the lamp is in use. A second anti-slip pad 450 is arranged at the top of the foldable lamp base 400 and corresponds to a position where the lamp post is mounted, to enhance the stability between the lamp post and the foldable lamp base 400.

Figure 19:
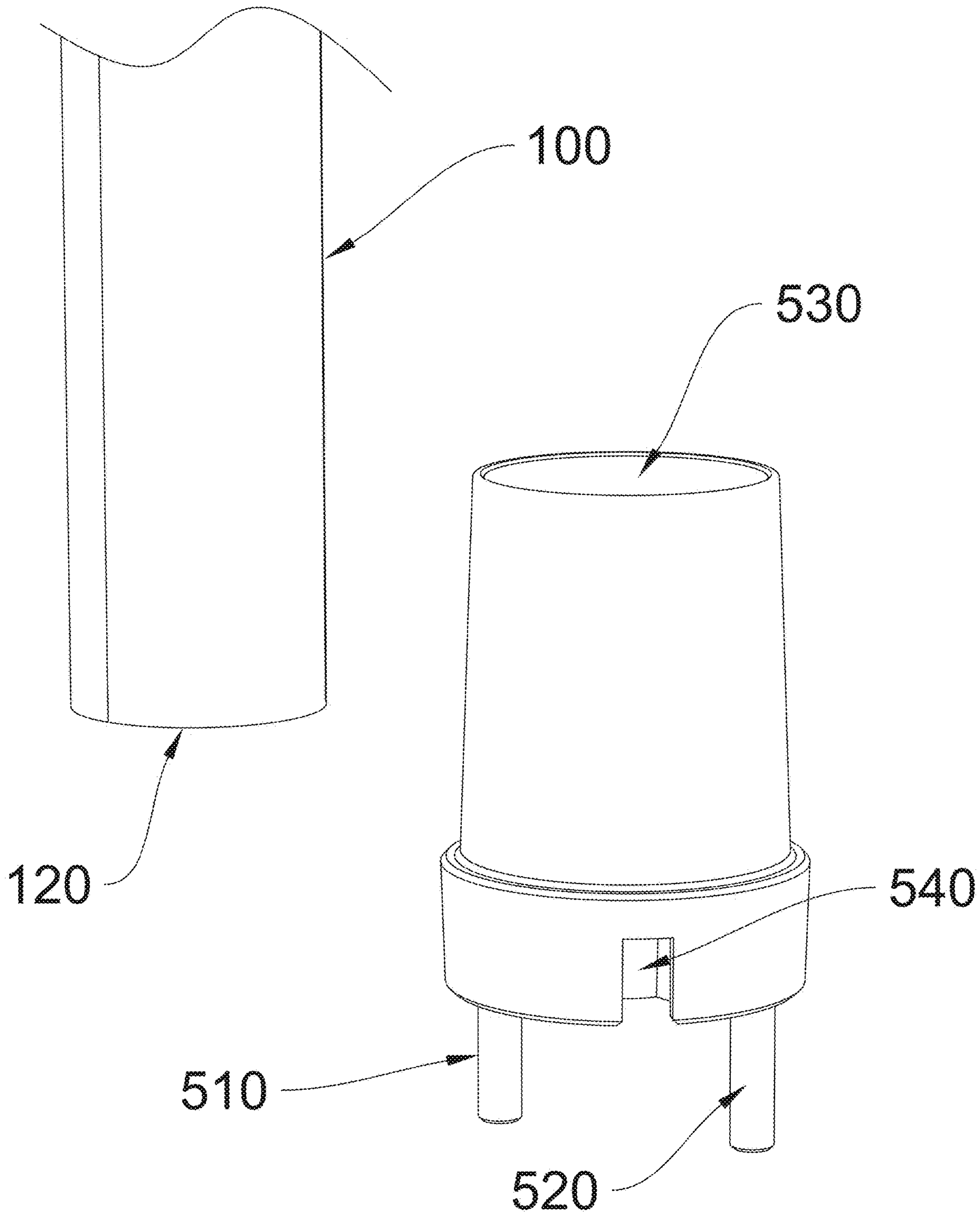
FIG. 19 is an exploded perspective view of a spliced lamp post and a connector according to an embodiment of the present application.

In an embodiment, referring to FIG. 19, the connector 500 and the first lamp rod 100 are detachably connected. Specifically, a connecting base is provided with a connecting hole 530 that may be sleeved onto an outer side of the second end 120 of the first lamp rod 100, thereby achieving the detachable connection between the connector 500 and the first lamp rod 100. As a preferred solution, an outer side of the connector 500 is provided with a wiring hole 540 communicating with an interior of the first lamp rod 100, thereby allowing a wire to penetrate through the wiring hole 540 into the first lamp rod 100 and achieving power supply and control of the lamp post.

From the above description, it can be seen that the above embodiments achieve the following technical effects:

1) the first lamp rod 100 and the second lamp rod 200 of the spliced lamp post are detachable, thereby reducing the storage volume of the spliced lamp post, facilitating the storage or packaging and transportation of the spliced lamp post, significantly reducing the transportation cost of the spliced lamp post, and avoiding damage to the spliced lamp post during transportation. The seamless splicing of the first lamp rod 100 and the second lamp rod 200 ensures good integrity and attractiveness of the spliced lamp post, as well as a continuous light-emitting end face and a good lighting effect. The first lamp rod 100 and the second lamp rod 200 can be powered and controlled uniformly.

2) The foldable lamp base 400 of the lamp and the spliced lamp post are detachable, thereby reducing the overall storage and packaging volume of the lamp. Folding the first bottom plate 410 and the second bottom plate 420 of the foldable lamp base 400 can greatly reduce the storage volume and lower the packaging and transportation costs of the lamp.

The above contents are merely preferred embodiments of the present application, and are not used for limiting the present application, and the present application may be variously modified and changed for those skilled in the art. Any modifications, equivalent substitutions, improvements, etc., made within the spirit and principle of the present application shall fall within the scope of protection of the present application.

What is claimed is:

1. A spliced lamp post, comprising:

a first lamp rod provided with a first end, wherein the first end of the first lamp rod is provided with a first electrical connector;

a second lamp rod having a front end, wherein the front end of the second lamp rod is provided with a second electrical connector; and a plug-in connector having a first plug-in end and a second plug-in end, wherein the first plug-in end of the plug-in connector is connected with the first end of the first lamp rod, the second plug-in end of the plug-in connector is connected with the front end of the second lamp rod, and the first electrical connector and the second electrical connector are connected and circuit conduction is activated in response to the first end of the first lamp rod abutting against the front end of the second lamp rod;

the first end of the first lamp rod is defined with a first plug-in hole;

a peripheral side of the plug-in connector is provided with a limiting protrusion;

the first lamp rod comprises a first housing and a first lamp panel, the first housing is defined with a first hollow channel, the first housing is recessed inward to define a first mounting groove, a first boss is formed on an inner wall of the first hollow channel, a first end of the hollow channel defines the first plug-in hole, and the first lamp panel is installed in the first mounting groove; and the plug-in connector is defined with a plug-in slot; the limiting protrusion comprises a first limiting protrusion, and the first limiting protrusion is arranged at a bottom of the plug-in slot; and the plug-in slot accommodates the first boss within the first hollow channel and the first limiting protrusion abut against the inner wall of the first plug-in hole to limit the first plug-in end of the plug-in connector within the first plug-in hole in response to the first plug-in end of the plug-in connector being inserted into the first plug-in hole.

2. The spliced lamp post according to claim 1, wherein the second plug-in end of the plug-in connector is fixedly connected with the front end of the second lamp rod, enabling the plug-in connector and the second lamp rod to be integrated and allowing the first plug-in end of the plug-in connector to be inserted into the first plug-in hole using the second lamp rod in response to the first lamp rod and the second lamp rod being assembled.

3. The spliced lamp post according to claim 2, wherein the first plug-in end of the plug-in connector is defined with a plug-in guide slope to guide the plug-in connector to be inserted into the first plug-in hole.

4. The spliced lamp post according to claim 1, wherein an outer end of the limiting protrusion is defined with a limiting guide slope to guide the limiting protrusion to be inserted into the first plug-in hole.

5. The spliced lamp post according to claim 1, wherein the first lamp rod further comprises a first light-transmitting lampshade that is installed on the first housing and located on an outer side of the first lamp panel.

6. The spliced lamp post according to claim 1, wherein the limiting protrusion comprises a second limiting protrusion, the second limiting protrusion is arranged on a lower side of the plug-in connector; and the second limiting protrusion abuts against the inner wall of the first plug-in hole to limit the first plug-in end of the plug-in connector within the first plug-in hole in response to the first plug-in end of the plug-in connector being inserted into the first plug-in hole.

7. The spliced lamp post according to claim 1, wherein the lower side of the plug-in connector is defined with a first positioning plane; and the first positioning plane abuts against a second side wall of the plug-in hole to limit a circumferential rotation of the plug-in connector within the first plug-in hole in response to the first plug-in end of the plug-in connector being inserted into the first plug-in hole.

8. The spliced lamp post according to claim 1, wherein the first plug-in end of the plug-in connector is defined with a hollow hole.

9. The spliced lamp post according to claim 1, wherein a plurality of the second lamp rods are arranged, and a number of a plurality of the plug-in connectors is the same as a number of the plurality of second lamp rods;

each second lamp rod also has a rear end, the rear end of each second lamp rod being provided with a third electrical connector;

the rear end of each second lamp rod and the front end of the adjacent second lamp rod is capable of being spliced by a corresponding plug-in connector; and the second electrical connector and the third electrical connector are connected and circuit conduction is activated in response to the rear end of the second lamp rod abutting against the front end of the adjacent second lamp rod.

10. A lamp, comprising a foldable lamp base and a spliced lamp post, the spliced lamp post comprising:

a first lamp rod provided with a first end, wherein the first end of the first lamp rod is provided with a first electrical connector;

a second lamp rod having a front end, wherein the front end of the second lamp rod is provided with a second electrical connector; and a plug-in connector having a first plug-in end and a second plug-in end, wherein the first plug-in end of the plug-in connector is connected with the first end of the first lamp rod, the second plug-in end of the plug-in connector is connected with the front end of the second lamp rod, and the first electrical connector and the second electrical connector are connected and circuit conduction is activated in response to the first end of the first lamp rod abutting against the front end of the second lamp rod;

wherein the foldable lamp base comprises a first bottom plate and a second bottom plate, the first bottom plate and the second bottom plate are connected by a hinge mechanism, the first bottom plate is defined with a first fixing hole, and the second bottom plate is defined with a second fixing hole;

the first lamp rod has a second end, the second end of the first lamp rod is provided with a connector, and the connector is provided with a first fixing post and a second fixing post; and the first fixing post is inserted into the first fixing hole, and the second fixing post is inserted into the second fixing hole to enable connection between the spliced lamp post and the lamp base and maintain an unfolded state of the first bottom plate and the second bottom plate;

the first end of the first lamp rod is defined with a first plug-in hole;

a peripheral side of the plug-in connector is provided with a limiting protrusion;

the first lamp rod comprises a first housing and a first lamp panel, the first housing is defined with a first hollow channel, the first housing is recessed inward to define a first mounting groove, a first boss is formed on an inner wall of the first hollow channel, a first end of the hollow channel defines the first plug-in hole, and the first lamp panel is installed in the first mounting groove; and the plug-in connector is defined with a plug-in slot; the limiting protrusion comprises a first limiting protrusion, and the first limiting protrusion is arranged at a bottom of the plug-in slot; and the plug-in slot accommodates the first boss within the first hollow channel and the first limiting protrusion abut against the inner wall of the first plug-in hole to limit the first plug-in end of the plug-in connector within the first plug-in hole in response to the first plug-in end of the plug-in connector being inserted into the first plug-in hole.

11. The lamp according to claim 10, wherein the first bottom plate is capable of being rotatably folded to a bottom of the second bottom plate and completely overlapping with the second bottom plate.

12. The lamp according to claim 10, wherein the connector and the first lamp rod are detachably connected.

13. The lamp according to claim 10, wherein an outer side of the connector is defined with a wiring hole communicating with an interior of the first lamp rod.

* * * * *